(12) United States Patent
Varanda

(10) Patent No.: US 7,515,135 B2
(45) Date of Patent: Apr. 7, 2009

(54) VIRTUAL KEYPAD FOR TOUCHSCREEN DISPLAY

(75) Inventor: Marcelo Varanda, Ottawa (CA)

(73) Assignee: Research In Motion Limited, Waterloo, ON (CA)

( * ) Notice: Subject to any disclaimer, the term of this patent is extended or adjusted under 35 U.S.C. 154(b) by 625 days.

(21) Appl. No.: 10/866,691

(22) Filed: Jun. 15, 2004

(65) Prior Publication Data

US 2005/0275633 A1 Dec. 15, 2005

(51) Int. Cl.
*G09G 5/00* (2006.01)
(52) U.S. Cl. .................... 345/156; 345/168; 345/173
(58) Field of Classification Search ......... 345/156–157, 345/160, 163, 166–170, 173–183; 178/18.01, 178/19.01, 20.01; 715/773, 863–864
See application file for complete search history.

(56) References Cited

U.S. PATENT DOCUMENTS

| 5,583,946 | A | | 12/1996 | Gourdol | |
| 5,870,083 | A | * | 2/1999 | Shieh | 345/173 |
| 6,120,960 | A | | 9/2000 | Aoki et al. | |
| 6,833,827 | B2 | * | 12/2004 | Lui et al. | 345/173 |
| 7,098,896 | B2 | * | 8/2006 | Kushler et al. | 345/168 |
| 7,199,786 | B2 | * | 4/2007 | Suraqui | 345/168 |
| 2005/0044500 | A1 | * | 2/2005 | Orimoto et al. | 715/706 |
| 2007/0042807 | A1 | * | 2/2007 | Khoo | 455/557 |

FOREIGN PATENT DOCUMENTS

| EP | 0684 542 | 11/1995 |
| WO | 0237254 | 5/2002 |

* cited by examiner

*Primary Examiner*—Richard Hjerpe
*Assistant Examiner*—Mansour M Said
(74) *Attorney, Agent, or Firm*—Moffat & Co.

(57) ABSTRACT

A method for changing a transparency level of a virtual keypad on a display, comprising the steps of: activating a pointing device on the display; and dragging the pointing device along the display for a predetermined distance; whereby said dragging step causes the transparency level of the virtual keypad on the display to change. The keypad can be arranged to include a stacked intuitive layout for keys, where the left side of a qwerty keyboard is placed over the right side of a qwerty keyboard to created a stacked virtual keyboard.

21 Claims, 17 Drawing Sheets

INTUITIVE QWERTY
LIKE KEYPAD

VIRTUAL KEYPAD FOR TOUCHSCREEN DISPLAY

FIELD OF THE INVENTION

The method and apparatus recited herein relates to touchscreen displays, and in particular relates to virtual keypads for these touchscreen displays.

BACKGROUND TO THE INVENTION

On devices with touchscreen displays it is often necessary to input text. This is generally done through either a physical keyboard, or through the representation of a keyboard on the touchscreen display.

In general, a keypad on a touchscreen display is small and located towards either the bottom or the top of the work area in order to provide a user with the ability to see a work area and what is being typed. Alternatively, if the keyboard is large, the work area is obscured and the user does not know what has been typed.

One solution to this is to implement a transparent virtual keypad on the touchscreen. An example of this was found in April 2004 on the website of lakefolks.org which includes keyboard transparency. This site teaches a keyboard that can be used on a personal computer where a mouse click causes a key to be registered in an application. A slider found using a menu option allows the user to make the keyboard more or less transparent.

On a wireless device, a transparent keypad was shown in April 2004 on the website of symbitz.com. This site teaches the use of a transparent keypad only for a handheld device.

The above solutions, however, do not provide the user with the ease of quickly changing the transparency of the keypad, nor do they present an optimal layout for the keys on a keypad.

SUMMARY OF THE PRESENT INVENTION

The present invention seeks to overcome the deficiencies of the prior art by providing a method for quickly and easily altering the transparency of a keypad. Further, when the solution is implemented on a device with a narrow screen, the method herein provides a method of arranging the keys to facilitate use of the keypad by a user.

The present invention therefore provides a method for changing a transparency level of a virtual keypad on a display, comprising the steps of: activating a pointing device on the display; and dragging the pointing device along the display for a predetermined distance; whereby said dragging step causes the transparency level of the virtual keypad on the display to change.

The present invention further provides a device with a variable transparency virtual keypad, said device comprising: a display; a pointing device for input on said display; and a processor for registering when a pointing device is activated on the display and said pointing device is dragged along the display for a predetermined distance, whereby said processor causes the transparency level of the virtual keypad on the display to change.

The present invention further provides a method of creating pulsation in a virtual keyboard comprising the steps of: setting a maximum transparency level, a minimum transparency level, and a delta transparency level; while the virtual keyboard is visible, checking whether the current keyboard transparency level is greater than the maximum transparency level or less than the minimum transparency level, and if yes, changing the sign of the delta transparency level; adding the delta transparency level to the current keyboard transparency level to form a new current keyboard transparency level; displaying the virtual keyboard at the new current keyboard transparency level; waiting for a predetermined time period; and looping back to the checking step.

The present invention further provides a method of arranging a virtual keypad on a narrow display comprising the steps of: breaking a standard keyboard layout into a left hand and a right hand portion; and creating a virtual keypad by placing the left hand portion over the right hand portion.

BRIEF DESCRIPTION OF THE DRAWINGS

The above advantages will be better understood with reference to the drawings in which.

DETAILED DESCRIPTION

A method and device that uses the method are described herein. The method and apparatus permit the simultaneous display of icons and a keypad in an overlapping format in which a user through movement of a pointing device against the display screen may make the keypad image, the icon image or both of varying transparency—from visible to transparent. In one embodiment, the keypad image and the icon image have inverse transparencies with respect to one another; for example, as the keypad image fades in, the icon image fades out. In another embodiment, the icon image remains constant in visibility as the keypad image fades in and out. The method may be incorporated into a handheld wireless communications device, although other devices, both mobile and fixed, and devices without communications are also contemplated. Although the embodiments may be described in terms of a stylus, other pointing devices, such as a wand or a finger, may be used.

Reference is now made to the drawings. FIGS. 1 to 11 show a touchscreen display in which the virtual keypad varies from a completely transparent mode in FIG. 1 to a completely opaque mode in FIG. 11. The transparency is user selectable to allow the user to choose their preference for how much of the background and how much of the keypad they wish to see. Previously, in order to change this transparency, the user would need to go to a pull-down menu, click on the pull-down menu, click on the item under that pull-down menu which would allow the preferences dialogue to open and in the preferences dialogue, a scroll bar would be used to change the transparency. The involvement of this many steps made it cumbersome for a user to change the transparency at will and limited the applicability of a variable transparency keypad.

Figure 17:
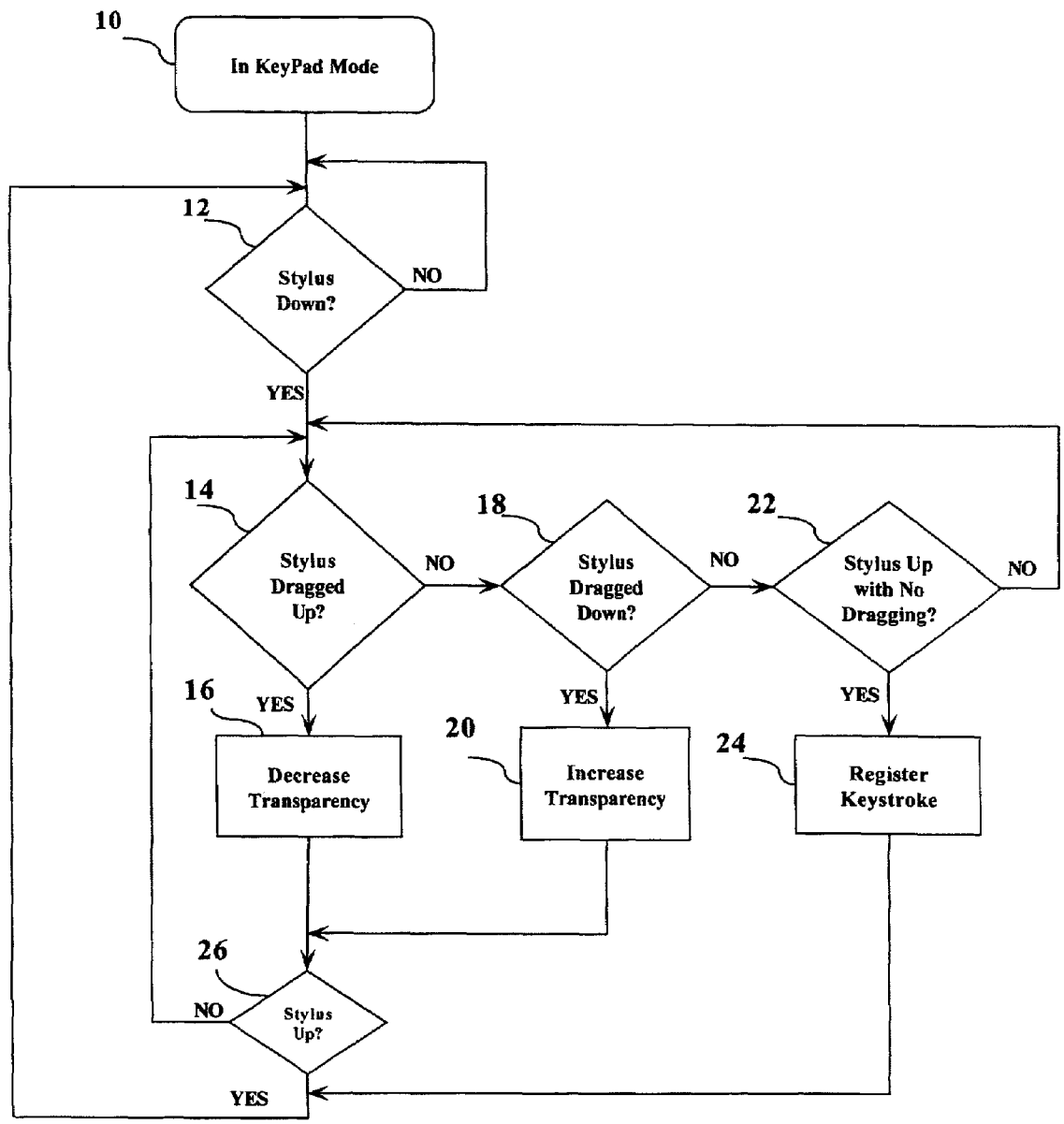
FIG. 17 shows a flowchart for a method for increasing or decreasing the transparency of the virtual keypad.

Specifically, a user may wish to hide the keypad temporarily in order to see what is under the keypad and then bring the keypad back to a desired transparency level quickly. This could not be accomplished easily using the menu pull-down systems. Reference is now made to FIG. 17.

FIG. 17 shows a method of the present invention when the user is in a keyboard mode 10. Keyboard mode could be entered into using methods known to those skilled in the art, including a physical button on the device or an icon on the display. Alternatively, the device can be in keyboard mode 10 permanently, and when the transparency falls below a certain level then icons or menus below the keyboard could be accessed. This threshold transparency could be set at the factory or be set by a user. In this alternate mode, the dragging of the pointing device below when the keyboard is below a threshold value will still increase or decrease the keyboard transparency.

As illustrated in FIG. 17, when in keyboard mode 10 the device waits and checks whether a pointing device (e.g., a stylus) has been placed on the touchpad. As one skilled in the art will appreciate, pointing devices could include alternatives such as the user's finger as the stylus or a mouse click as being a stylus down event. The examples below include a stylus, but are not meant to be limited to this, and any pointing device or mouse could be used.

The device stays in the checking mode 12 until a stylus down event occurs, after which processing proceeds to step 14. In step 14, the device checks whether the stylus was dragged in an upward direction on the touchscreen. As indicated above, this could also be the mouse moving in an upward direction with a mouse button clicked. If the stylus has been found to be dragged up in step 14, processing proceeds to step 16 in which the transparency of the screen is decreased to a minimum transparency threshold. This would be like moving from FIG. 1 to FIG. 2 to FIG. 3, etc.

If, in step 14, the stylus has been found not to have been dragged up, processing next proceeds to step 18. In step 18, the device checks whether the stylus has been dragged down. If the stylus has been dragged down, then processing proceeds to step 20 in which the transparency is increased to a maximum transparency threshold. This could be seen through the movement from FIG. 11 to FIG. 10 to FIG. 9, etc.

If the pointing device has been neither dragged up nor down, processing next proceeds to step 22. In step 22, the device checks to see whether the stylus has been raised with no dragging, or without dragging a minimum predetermined threshold. This would indicate that the user selected a point on the screen which would mean a keystroke has been entered and processing proceeds to step 24 in which the keystroke is registered with the device.

If in step 22 the device finds that the stylus has not been raised, processing next proceeds back to step 14 in which it checks whether the stylus has been dragged up and this loop continues until something happens with the stylus.

From steps 16 or 20, if the transparency has been increased or decreased, processing next proceeds to step 26. In step 26 the device checks whether the stylus has been released or moved off the touchscreen. This will indicate to the device that the desired transparency has been achieved and processing next proceeds back to step 12 in which it looks for a stylus down event.

Conversely, if in step 26 the stylus has not been raised, then the user may still be adjusting the transparency and thus processing proceeds back to step 14 in which it checks whether the stylus has been dragged up and continues this loop.

From step 24 in which a keystroke is registered and the device is still in a keypad mode, processing proceeds back to step 12 in which the device waits for a stylus down event.

As indicated above, this stylus event could also include other similar events including events using a mouse. Also, while the above discusses dragging up and down, one skilled in the art will realize that dragging left and right or diagonally could also be used. In some embodiments dragging down could decrease the transparency and dragging the stylus up could increase the transparency. In other embodiments dragging the stylus at any angle up or right could increase the transparency, and dragging the stylus at any angle down or left could decrease the transparency, or vice versa. The examples above are not meant to limit the present method to dragging in any specific direction.

The level of transparency change is determined based on the length the stylus is dragged, up to a maximum or minimum threshold. Thus a short drag will only produce a small change in transparency, whereas a longer drag will produce a greater change in the transparency. FIGS. 21 to 24 show progressive transparency changes for pointer strokes.

In some situations the user may intend to input a keystroke but may slip a small amount with the stylus. This could be as a result of shaking in the user's hand or the environment the user is operating in. A small slip could cause the above algorithm to increase or decrease the transparency rather than entering the keystroke. In an alternative embodiment this may be overcome by allowing for a predetermined minimum drag length before changing the transparency. This minimum drag length could be a preset number of pixels traversed or a linear distance measure, and could be set at the factory by the user. In the alternative embodiment, if the user does not exceed the threshold minimum drag, the event would be registered as a keystroke rather than a transparency change.

In a further alternative embodiment a drag wholly contained within a key on the keyboard may be registered as a keystroke rather than a transparency change. Conversely, if the drag of the stylus goes over the boundary of a key then this could be considered a transparency change rather than a keystroke.

Figure 18:
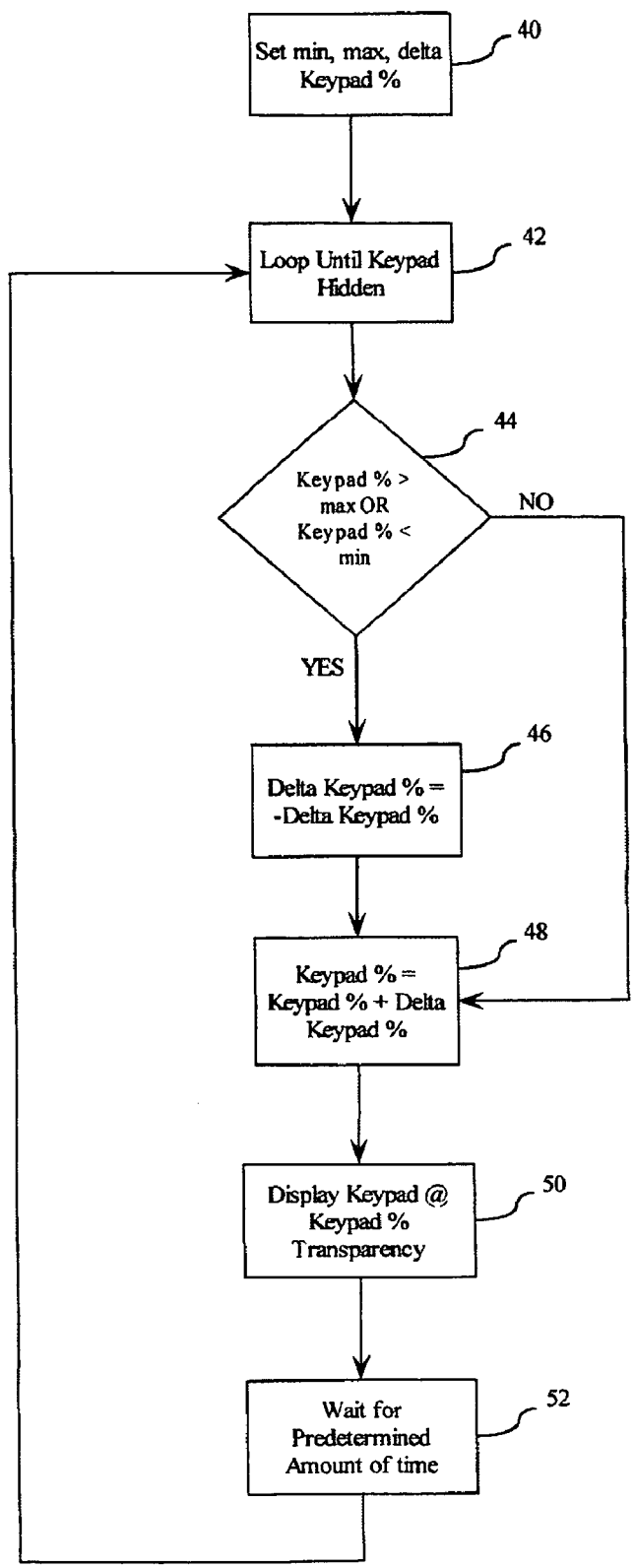
FIG. 18 shows a method of the present invention for pulsating variable transparency for the present keypad.

The method herein further provides for a pulsating transparent virtual keypad. In this case, a user can set the maximum transparency and the minimum transparency and the rate of pulsation and causes the keypad to continually move from a darker to a lighter and back to a darker state. Reference is now made to FIG. 18.

In step 40, a user sets a minimum, a maximum, and the amount that the transparency changes in each step. These values will have limits, and one skilled in the art will realize that any of these can be set independently of the others, or that the delta percentage be a predefined value that cannot be set.

Once the minimum, maximum and delta keypad percentages have been set, processing next proceeds to step 42. In step 42, the system loops until the user exits from a keypad mode.

Processing next proceeds to step 44. In step 44, the device first checks whether the percentage transparency of the keypad is greater than the maximum set in step 40 or the percentage transparency of the keypad is less than the minimum set in step 40. If yes, processing proceeds to step 46 in which the delta keypad percentage is changed to a negative delta keypad percentage.

Processing proceeds from either step 44 if the keypad percentage is greater than the minimum, or after the sign of the delta keypad has been changed in step 46 to step 48. In step 48, the keypad percentage is incremented by the delta keypad percentage. One skilled in the art will realize that if the delta keypad percentage is a positive, the transparency will increase, whereas if the delta keypad percentage is a negative, the transparency will decrease.

Processing next proceeds to step 50 in which the keypad is displayed at the keypad percentage that was determined in step 48.

Processing next proceeds to step 52 in which a predetermined amount of time is allowed to expire. This amount of time may be able to be set by a user in order to increase or decrease the pulsating rate, and this may be used in conjunction or separately from the change in the delta keypad percentage.

Processing next proceeds to step 42 and continues to loop as long as the device is in a keypad mode.

With the method of FIG. 18, the keyboard display of the device pulsates between a minimum and a maximum. When the minimum or maximum is achieved, the sign of the change in the transparency is reversed, thus reversing whether the transparency is increasing or decreasing. This pulsation continues until the keypad mode is exited.

Alternatively, instead of pulsation the device could alternate between two transparency modes, such as a high and low transparency, or could flash at a certain transparency level at a preset or user settable frequency.

In a further alternative embodiment, underlying icons could vary in transparency inversely to the transparency of the keyboard. Thus if the keyboard was more transparent, the icons under it could be less transparent.

On devices in which the touchscreen is narrow, it is desirable to still have large keys. It is therefore desirable to have a keypad arrangement that does not limit the virtual keypad to five rows as in a standard keyboard. The Symbitz example cited above accomplishes this by providing a keypad in which the keys are arranged alphabetically and in which the vowels are allowed to be aligned on the left side. However, for a skilled typist this is not an intuitive arrangement for the keys.

Figure 12:
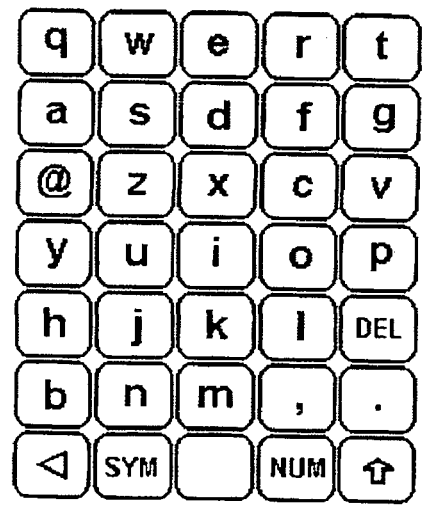
FIG. 12 shows a layout for a keypad in which the keys are taken from a standard qwerty keyboard and stacked so the lefthand portion of the keyboard is at the top and the righthand portion of the keyboard is at the bottom.
Figure 13:
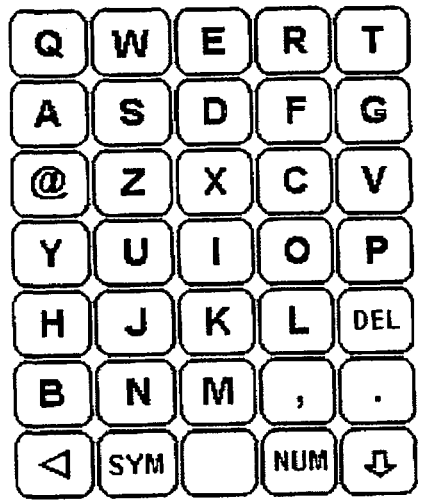
FIG. 13 is a keyboard using the same layout as FIG. 12 with capital keys.
Figure 16:
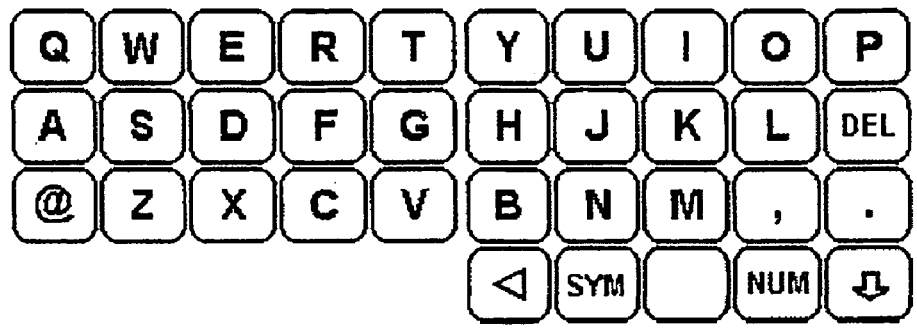
FIG. 16 shows the transformation of a qwerty like keyboard.
Figure 16:
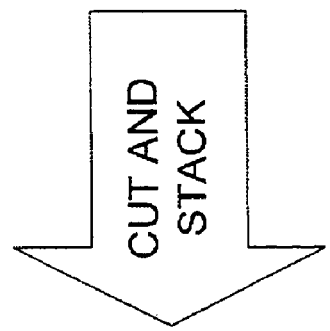
Figure 16:
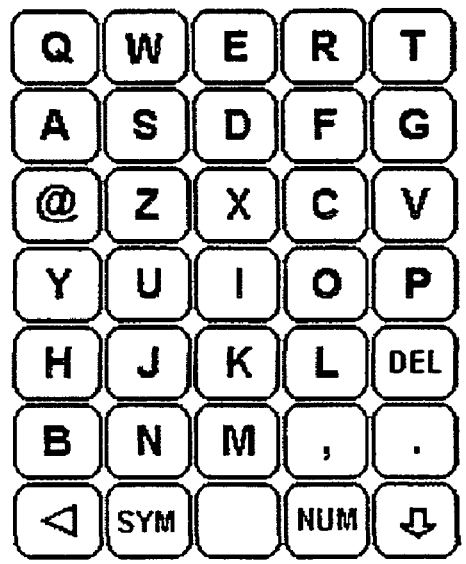

The method of the present invention further provides an arrangement of keys as illustrated in FIGS. 12, 13 and 16 in which a standard qwerty keyboard is stacked with the left side of the keyboard on top and the right side of the keyboard underneath. This allows the user to type with their thumbs with the left hand higher than the right hand but still using a standard keyboard layout that the typist is used to. Although the QWERTY keyboard is described, other keyboard arrangements, such as DVORAK, may be used.

With reference to FIG. 12, the top row 70 would be the standard upper row of letters that a user would type with his or her left hand, row 72 would be the standard base row that a user would type with his or her left hand, and row 74 is a lower row the user would type with his or her left hand with the exception of the @ key which has been added in this row in this example. However, one skilled in the art will realize that this @ key does not need to placed in row 74 and row 74 could instead include B after the V as in a standard keyboard. Similarly, row 76 includes the upper row of letters that a typist would use with his or her right hand. Row 78 includes the base row of letters but replacing the semi-colon with a delete. Row 80 includes the lower row a user would use with his or her right hand by adding a B and removing the question mark.

The above provides a much more intuitive keyboard layout to a user who is used to typing on a standard qwerty keyboard.

Figure 15:
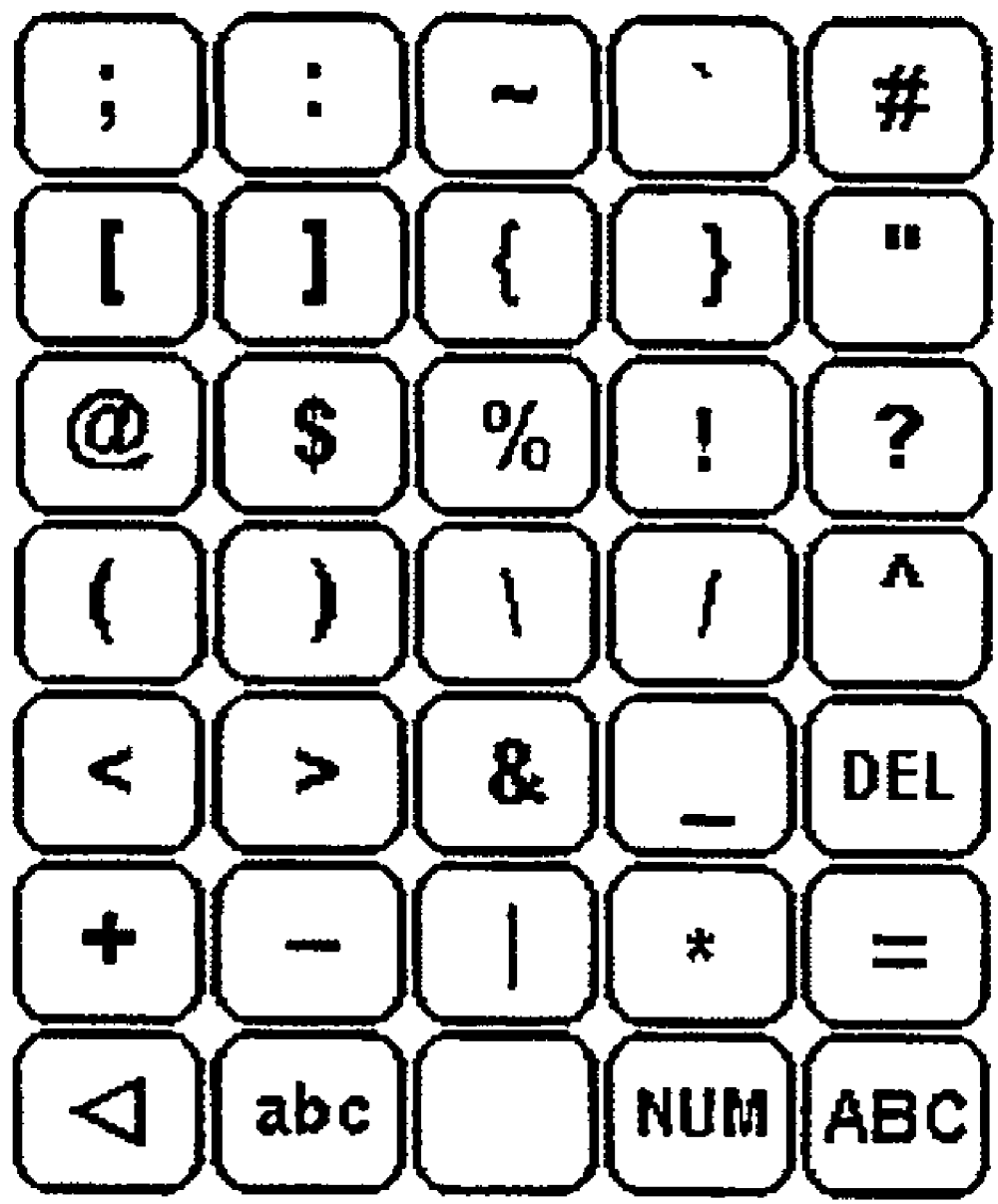
FIG. 15 shows a layout for symbols.

As will be seen in row 82, if a user wishes to transfer the virtual keypad to symbols, a symbol key 84 is provided which transfers the keypad to that of FIG. 15.

Figure 14:
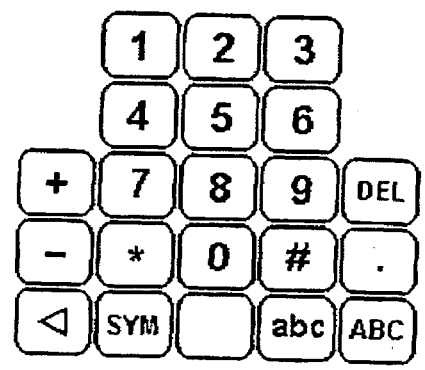
FIG. 14 shows an arrangement for numbers.

Similarly, a number key 86 transfers the virtual keypad to that of FIG. 14 and an upper case button 88 transfer the virtual keypad to that of FIG. 13.

As is be seen in FIGS. 14 and 15, an abc key 90 changes the virtual keypad to that of FIG. 12, and ABC key 92 changes the keypad to that of FIG. 13.

As is also seen in FIG. 13, a down arrow 94 changes the virtual keypad to that of FIG. 12.

The above layout and the option to transfer between different keypads provides a more intuitive typing environment to a user and further provides ease of transfer between capital letters, small letters, numbers or symbols.

In one embodiment of the present system and method it is contemplated that the virtual keypad be implemented on a wireless communications device. The system and method is not however meant to be limited to only this application, and other applications, including computer monitors, digital assistants, kiosk displays or any other display, both fixed and mobile, on which a virtual keypad can be implemented is meant to be within the scope of the present invention.

Figure 19:
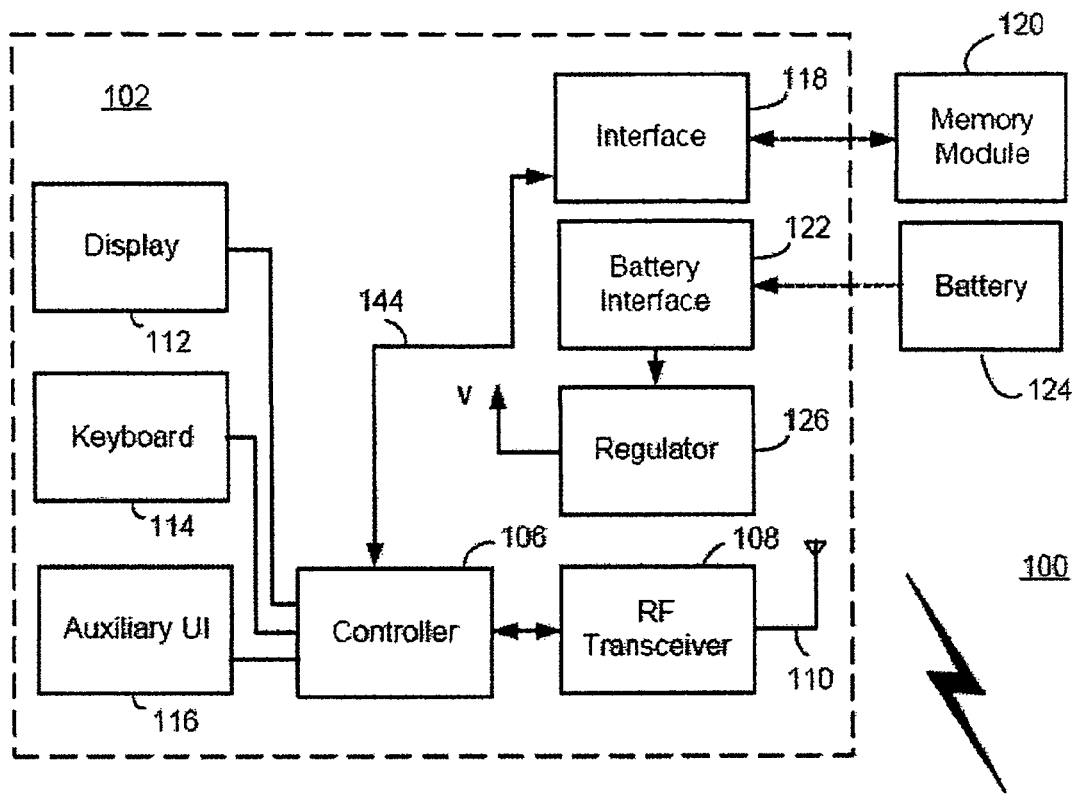
FIG. 19 shows a block diagram of a communications system, including a mobile station upon which the virtual keypad can be implemented.
Figure 19:
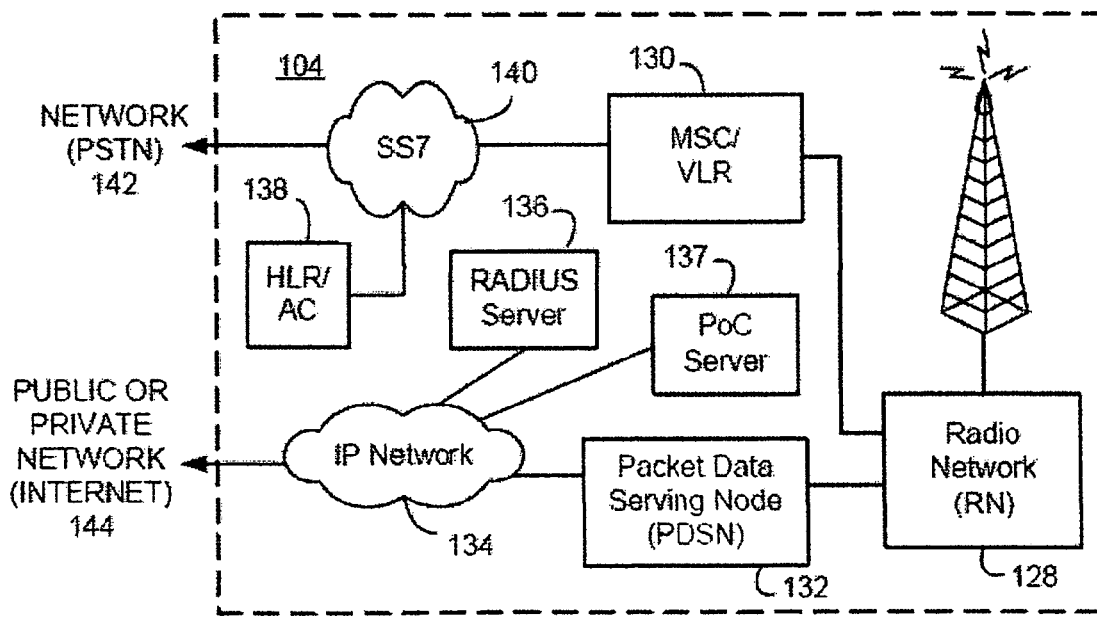

Reference is now made to FIG. 19. FIG. 19 is a block diagram of a communication system 100 which includes a mobile station 102 which communicates through a wireless communication network 104. Mobile station 102 preferably includes a visual display 112, a keyboard 114, and perhaps one or more auxiliary user interfaces (UI) 116, each of which is coupled to a controller 106. Controller 106 is also coupled to radio frequency (RF) transceiver circuitry 108 and an antenna 110.

Typically, controller 106 is embodied as a central processing unit (CPU) which runs operating system software in a memory component (not shown). Controller 106 will normally control overall operation of mobile station 102, whereas signal processing operations associated with communication functions are typically performed in RF transceiver circuitry 108. Controller 106 interfaces with device display 112 to display received information, stored information, user inputs, and the like. Keyboard 114, which may be a telephone type keypad or full alphanumeric keyboard, is normally provided for entering data for storage in mobile station 102, information for transmission to network 104, a telephone number to place a telephone call, commands to be executed on mobile station 102, and possibly other or different user inputs.

Mobile station 102 sends communication signals to and receives communication signals from network 104 over a wireless link via antenna 110. RF transceiver circuitry 108 performs functions similar to those of a radio network (RN) 128, including for example modulation/demodulation and possibly encoding/decoding and encryption/decryption. It is also contemplated that RF transceiver circuitry 108 may perform certain functions in addition to those performed by RN 128. It will be apparent to those skilled in art that RF transceiver circuitry 108 will be adapted to particular wireless network or networks in which mobile station 102 is intended to operate.

Mobile station 102 includes a battery interface 122 for receiving one or more rechargeable batteries 124. Battery 124 provides electrical power to electrical circuitry in mobile station 102, and battery interface 122 provides for a mechanical and electrical connection for battery 124. Battery interface 122 is coupled to a regulator 126 which regulates power to the device. When mobile station 102 is fully operational, an RF transmitter of RF transceiver circuitry 108 is typically turned on only when it is sending to network, and is otherwise turned off to conserve resources. Similarly, an RF receiver of RF transceiver circuitry 108 is typically periodically turned off to conserve power until it is needed to receive signals or information (if at all) during designated time periods.

Mobile station 102 operates using a memory module 120, such as a Subscriber Identity Module (SIM) or a Removable User Identity Module (R-UIM), which is connected to or inserted in mobile station 102 at an interface 118. As an alternative to a SIM or an R-UIM, mobile station 102 may operate based on configuration data programmed by a service provider into an internal memory which is a non-volatile memory. Mobile station 102 may consist of a single unit, such as a data communication device, a cellular telephone, a multiple-function communication device with data and voice communication capabilities, a personal digital assistant (PDA) enabled for wireless communication, or a computer incorporating an internal modem. Alternatively, mobile station 102 may be a multiple-module unit comprising a plurality of separate components, including but in no way limited to a computer or other device connected to a wireless modem. In particular, for example, in the mobile station block diagram of FIG. 19, RF transceiver circuitry 108 and antenna 110 may be implemented as a radio modem unit that may be inserted into a port on a laptop computer. In this case, the laptop computer would include display 112, keyboard 114, and one or more auxiliary UIs 116, and controller 106 may remain within the radio modem unit that communicates with the computer's CPU or be embodied as the computer's CPU. It is also contemplated that a computer or other equipment not normally capable of wireless communication may be adapted to connect to and effectively assume control of RF transceiver circuitry 108 and antenna 110 of a single-unit device such as one of those described above. Such a mobile station 102 may have a more particular implementation as described later in relation to mobile station 202 of FIG. 20.

Mobile station 102 communicates in and through wireless communication network 104. In the embodiment of FIG. 19, wireless network 104 is a Third Generation (3G) supported network based on Code Division Multiple Access (CDMA) technologies. In particular, wireless network 104 is a CDMA2000 network which includes fixed network components coupled as shown in FIG. 19. Wireless network 104 of the CDMA2000-type includes a Radio Network (RN) 128, a Mobile Switching Center (MSC) 130, a Signaling System 7 (SS7) network 140, a Home Location Register/Authentication Center (HLR/AC) 138, a Packet Data Serving Node (PDSN) 132, an IP network 134, and a Remote Authentication Dial-In User Service (RADIUS) server 136. SS7 network 140 is communicatively coupled to a network 142 (such as a Public Switched Telephone Network or PSTN), whereas IP network is communicatively coupled to a network 144 (such as the Internet).

During operation, mobile station 102 communicates with RN 128 which performs functions such as call-setup, call processing, and mobility management. RN 128 includes a plurality of base station transceiver systems that provide wireless network coverage for a particular coverage area commonly referred to as a "cell". A given base station transceiver system of RN 128, such as the one shown in FIG. 19, transmits communication signals to and receives communication signals from mobile stations within its cell. The base station transceiver system normally performs such functions as modulation and possibly encoding and/or encryption of signals to be transmitted to the mobile station in accordance with particular, usually predetermined, communication protocols and parameters, under control of its controller. The base station transceiver system similarly demodulates and possibly decodes and decrypts, if necessary, any communication signals received from mobile station 102 within its cell. Communication protocols and parameters may vary between different networks. For example, one network may employ a different modulation scheme and operate at different frequencies than other networks. The underlying services may also differ based on its particular protocol revision.

The wireless link shown in communication system 100 of FIG. 19 represents one or more different channels, typically different radio frequency (RF) channels, and associated protocols used between wireless network 104 and mobile station 102. An RF channel is a limited resource that must be conserved, typically due to limits in overall bandwidth and a limited battery power of mobile station 102. Those skilled in art will appreciate that a wireless network in actual practice may include hundreds of cells depending upon desired overall expanse of network coverage. All pertinent components may be connected by multiple switches and routers (not shown), controlled by multiple network controllers.

For all mobile station's 102 registered with a network operator, permanent data (such as mobile station 102 user's profile) as well as temporary data (such as mobile station's 102 current location) are stored in a HLR/AC 138. In case of a voice call to mobile station 102, HLR/AC 138 is queried to determine the current location of mobile station 102. A Visitor Location Register (VLR) of MSC 130 is responsible for a group of location areas and stores the data of those mobile stations that are currently in its area of responsibility. This includes parts of the permanent mobile station data that have been transmitted from HLR/AC 138 to the VLR for faster access. However, the VLR of MSC 130 may also assign and store local data, such as temporary identifications. Mobile station 102 is also authenticated on system access by HLR/AC 138. In order to provide packet data services to mobile station 102 in a CDMA2000-based network, RN 128 communicates with PDSN 132. PDSN 132 provides access to the Internet 144 (or intranets, Wireless Application Protocol (WAP) servers, etc.) through IP network 134. PDSN 132 also provides foreign agent (FA) functionality in mobile IP networks as well as packet transport for virtual private networking. PDSN 132 has a range of IP addresses and performs IP address management, session maintenance, and optional caching. RADIUS server 136 is responsible for performing functions related to authentication, authorization, and accounting (AAA) of packet data services, and may be referred to as an AAA server.

Wireless communication network 104 also includes a Push-to-talk over Cellular (PoC) server 137 which may be coupled to IP network 134. PoC server 137 operates to facilitate PoC individual and group communication sessions between mobile stations within network 104. A conventional PoC communication session involves a session connection between end users of mobile stations, referred to as session "participants", who communicate one at a time in a half-duplex manner much like conventional walkie-talkies or two-way radios.

Figure 1:
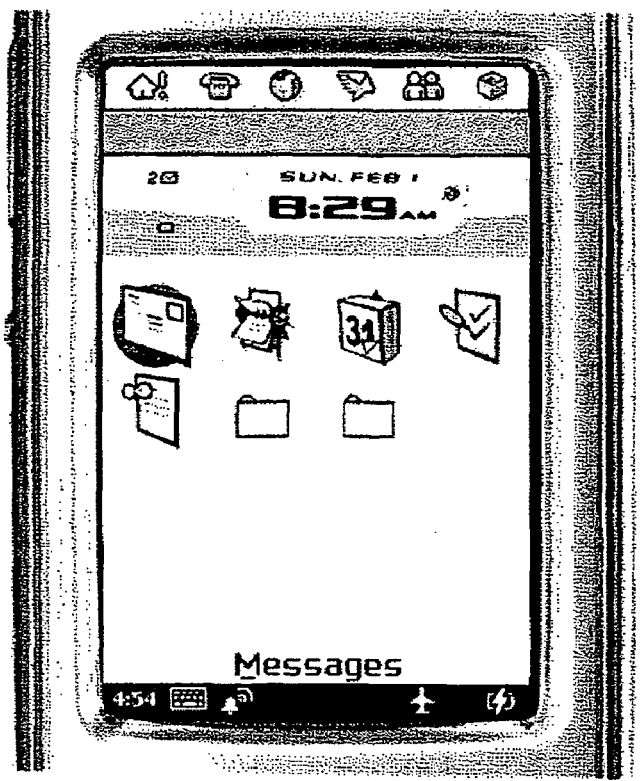
FIG. 1 is a touchscreen showing no keypad.
Figure 2:
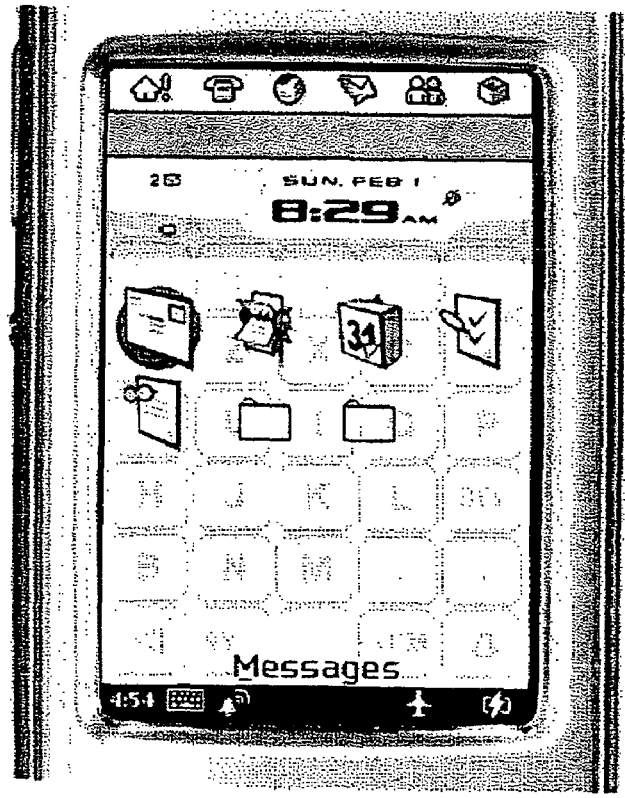
FIG. 2 is a touchscreen showing a keypad at 90% transparency.
Figure 3:
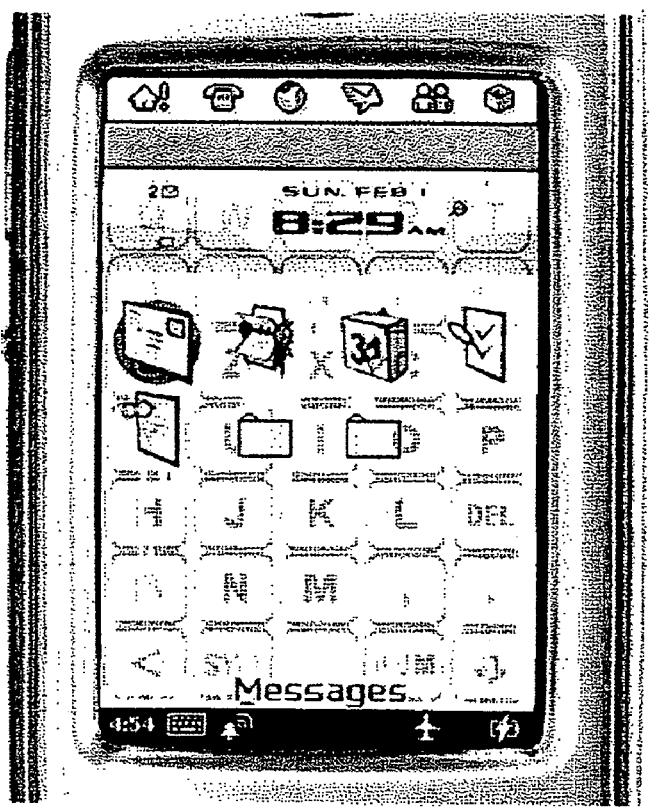
FIG. 3 is a touchscreen showing a keypad at 80% transparency.
Figure 4:
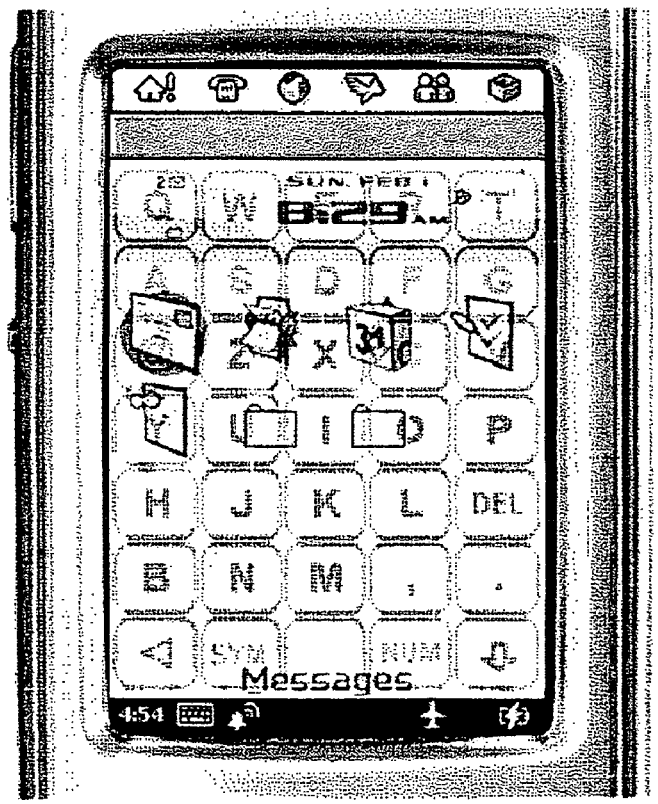
FIG. 4 is a touchscreen showing a keypad at 70% transparency.
Figure 5:
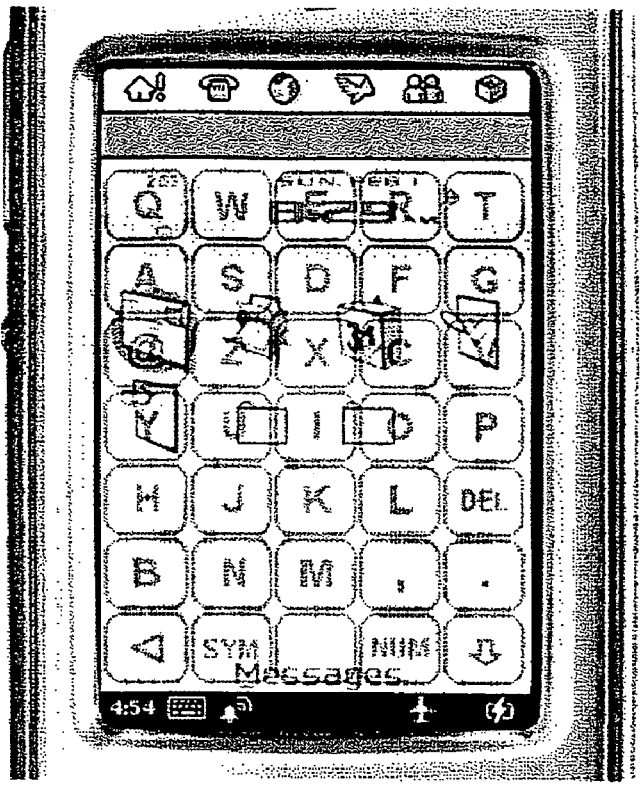
FIG. 5 is a touchscreen showing a keypad at 60% transparency.
Figure 6:
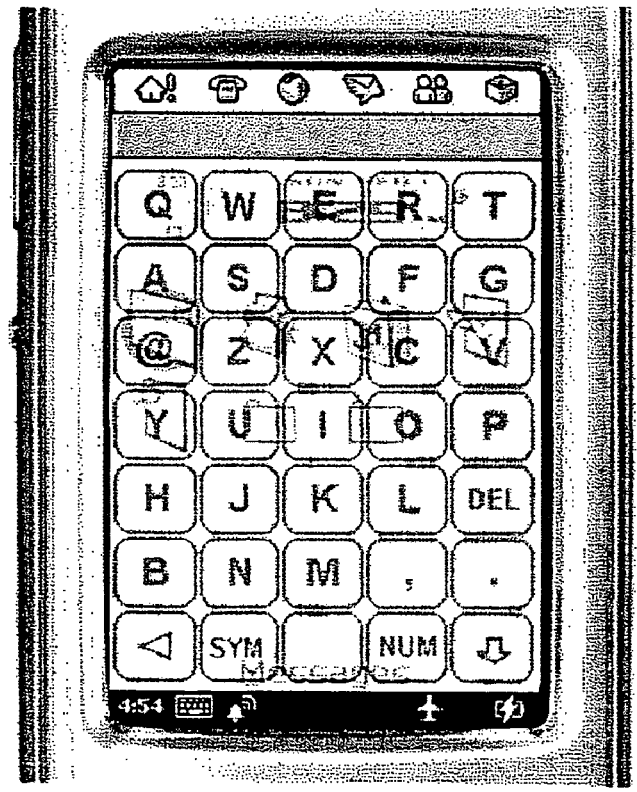
FIG. 6 is a touchscreen showing a keypad at 50% transparency.
Figure 7:
FIG. 7 is a touchscreen showing a keypad at 40% transparency.
Figure 8:
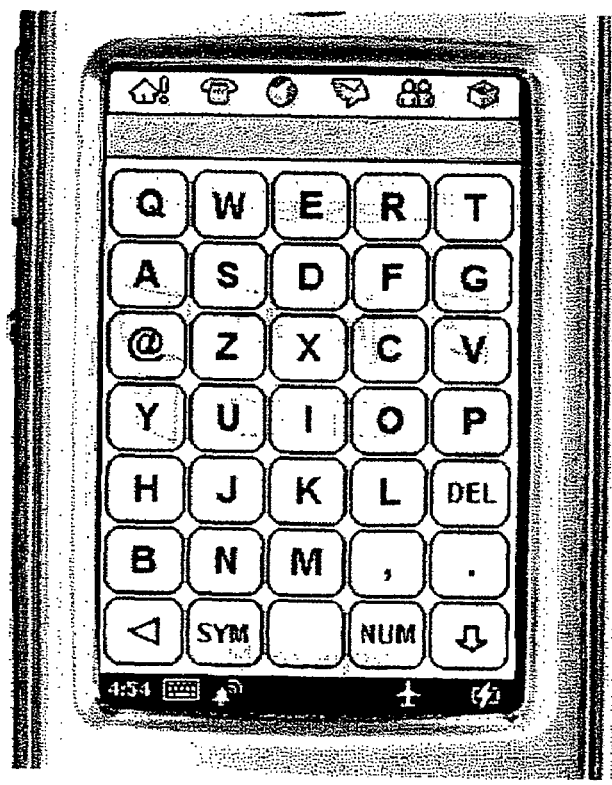
FIG. 8 is a touchscreen showing a keypad at 30% transparency.
Figure 9:
FIG. 9 is a touchscreen showing a keypad at 20% transparency.
Figure 10:
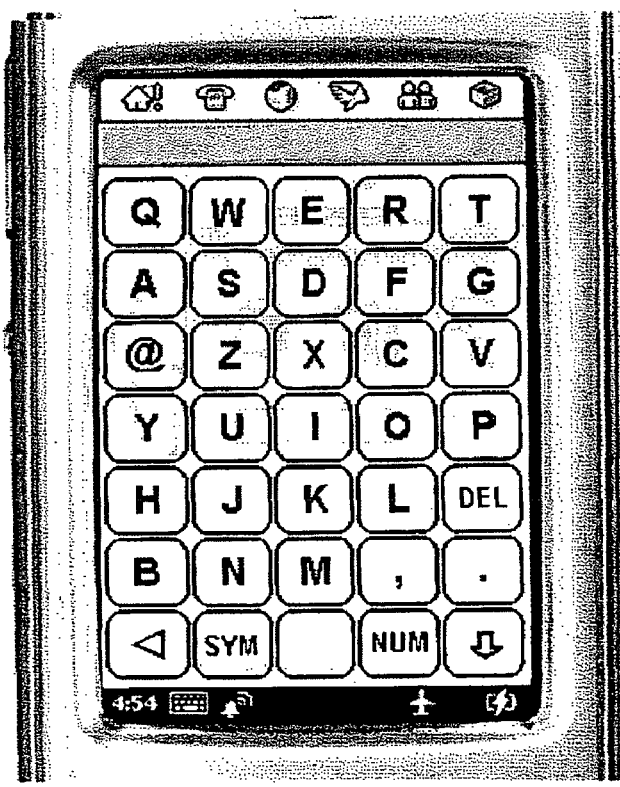
FIG. 10 is a touchscreen showing a keypad at 10% transparency.
Figure 11:
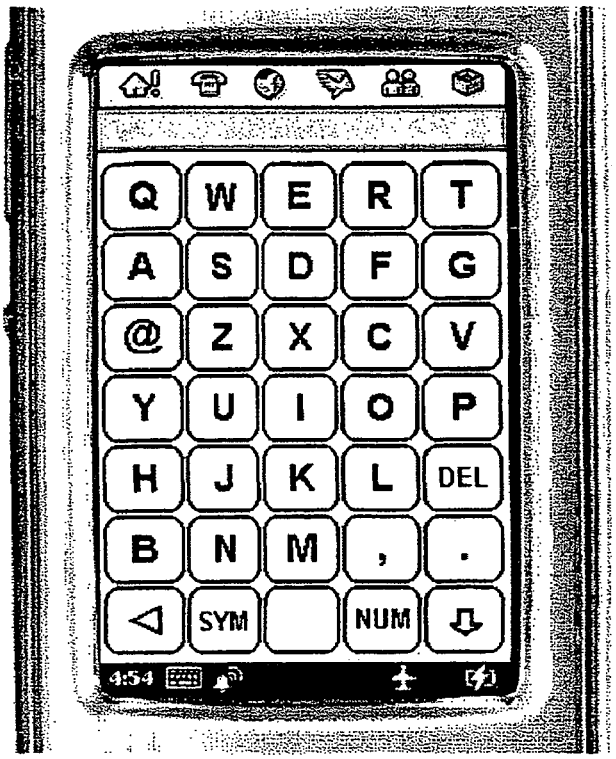
FIG. 11 is a touchscreen showing a keypad at 0% transparency.

Those skilled in art will appreciate that wireless network 104 may be connected to other systems, possibly including other networks, not explicitly shown in FIG. 1. A network will normally be transmitting at very least some sort of paging and system information on an ongoing basis, even if there is no actual packet data exchanged. Although the network consists of many parts, these parts all work together to result in certain behaviours at the wireless link.

Figure 20:
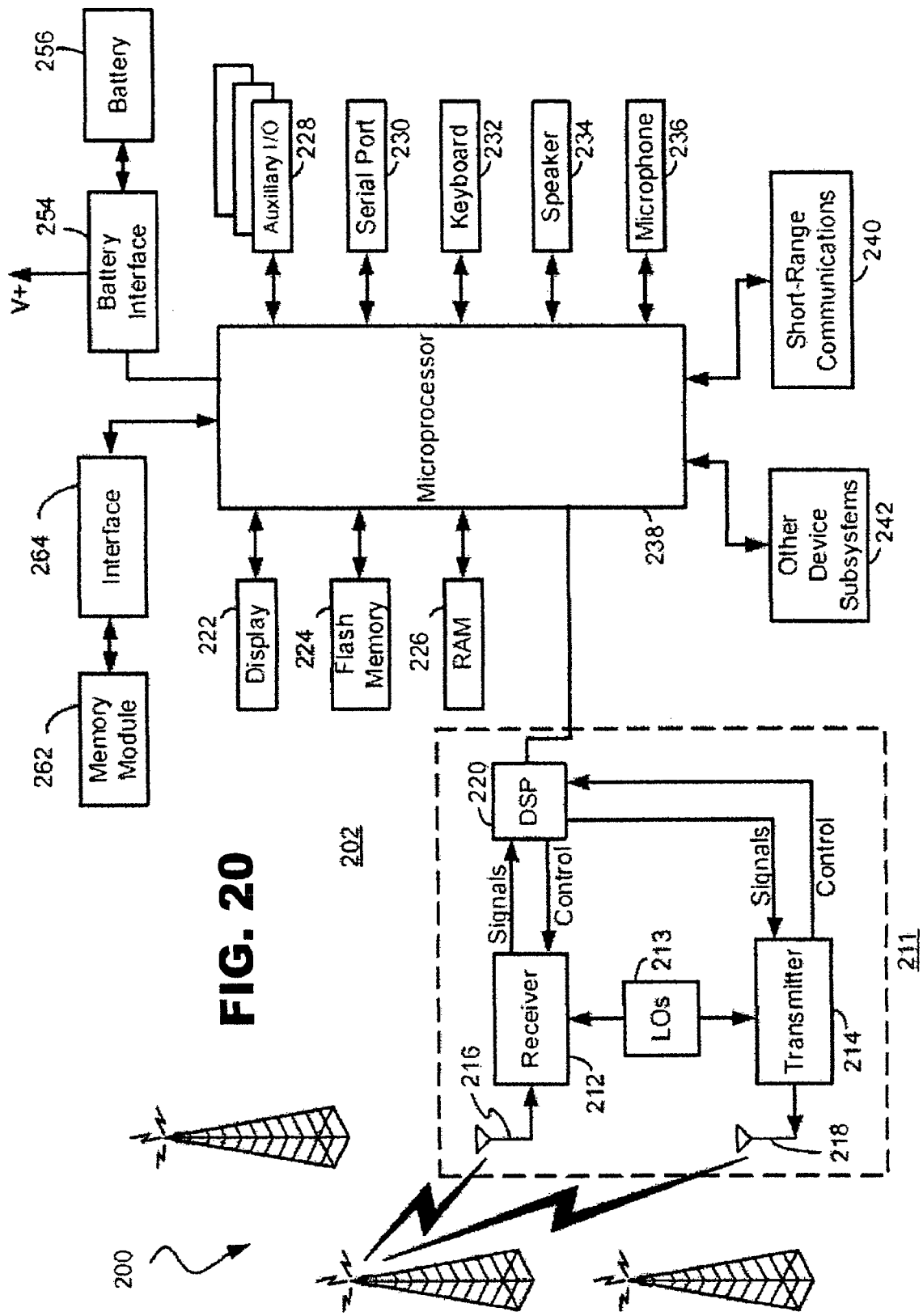
FIG. 20 shows a block diagram of a mobile station upon which the virtual keypad can be implemented.
Figure 21:
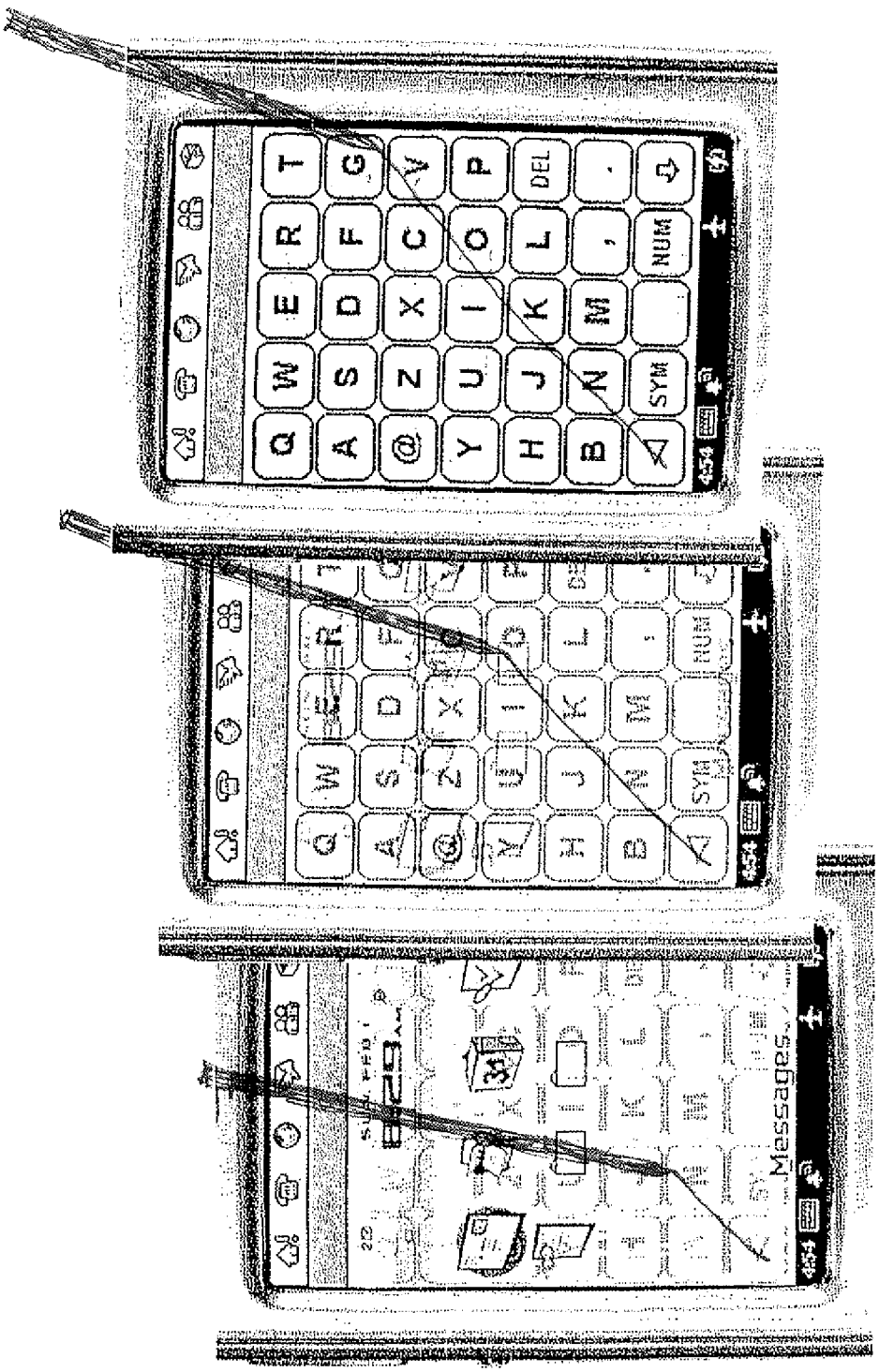
FIG. 21 is a schematic diagram showing a touchscreen display undergoing a progressive keypad transparency change.
Figure 22:
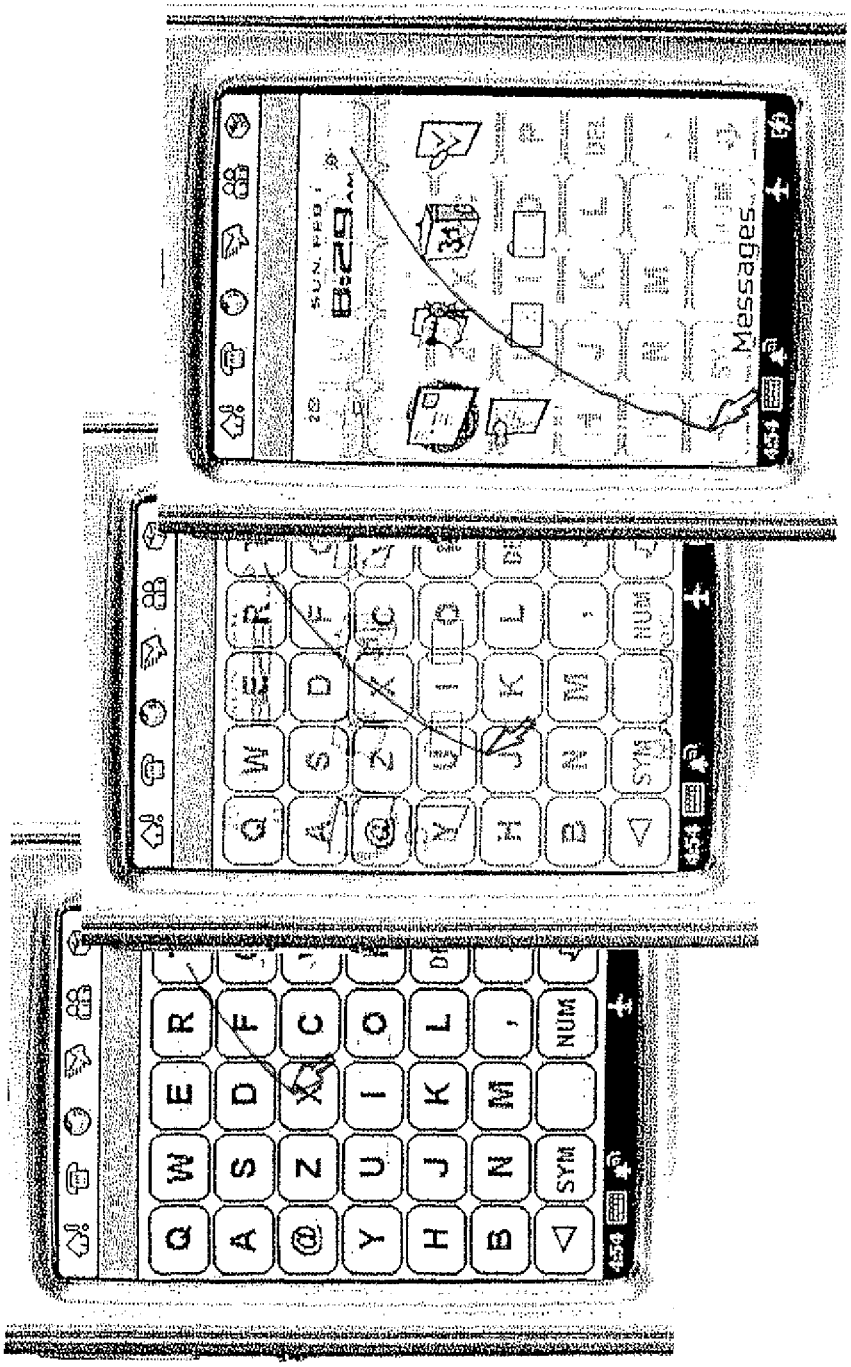
FIG. 22 is a schematic diagram showing a display undergoing another progressive keypad transparency change.
Figure 23:
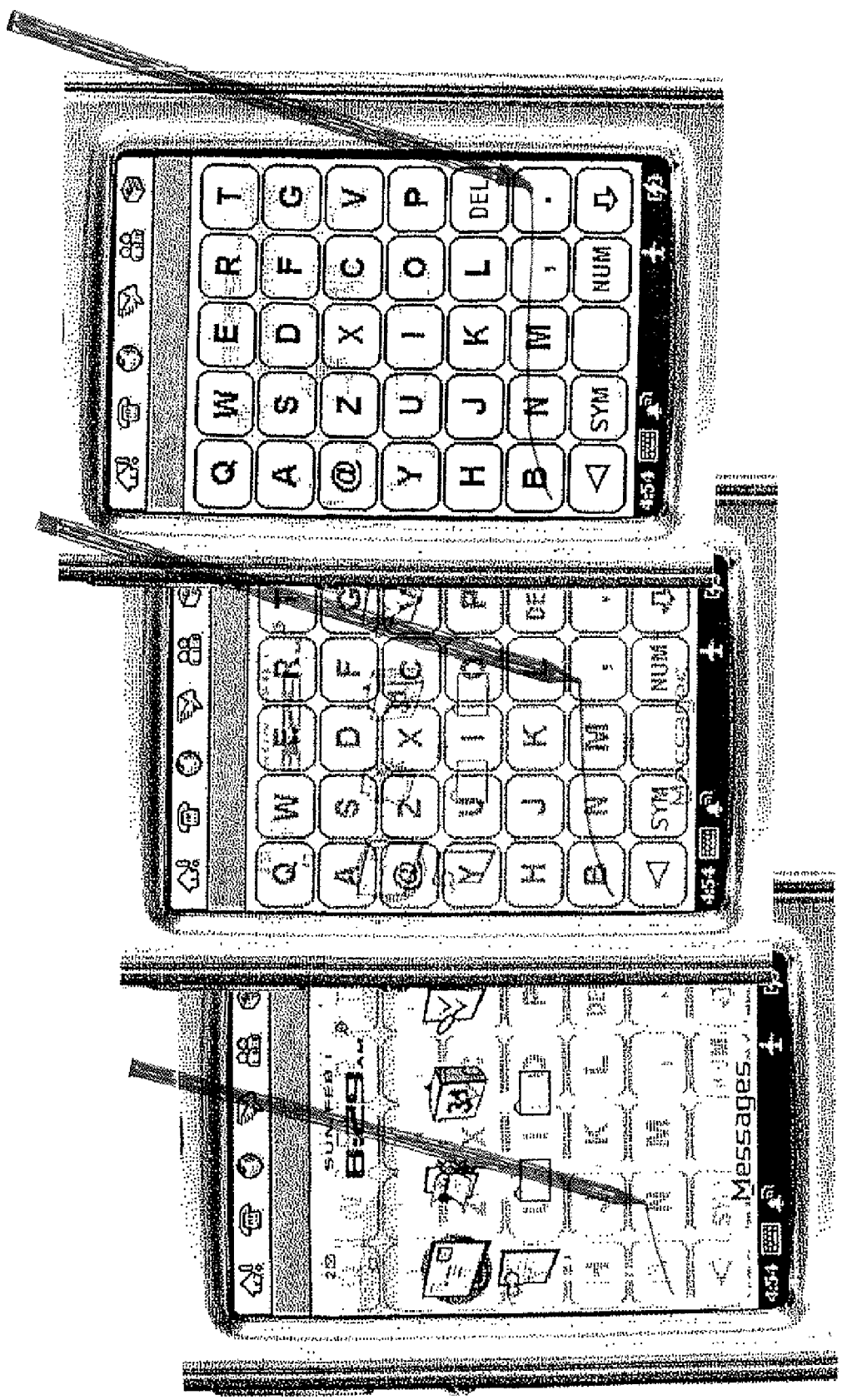
FIG. 23 is a schematic diagram showing the touchscreen display undergoing a further progressive keypad transparency change.
Figure 24:
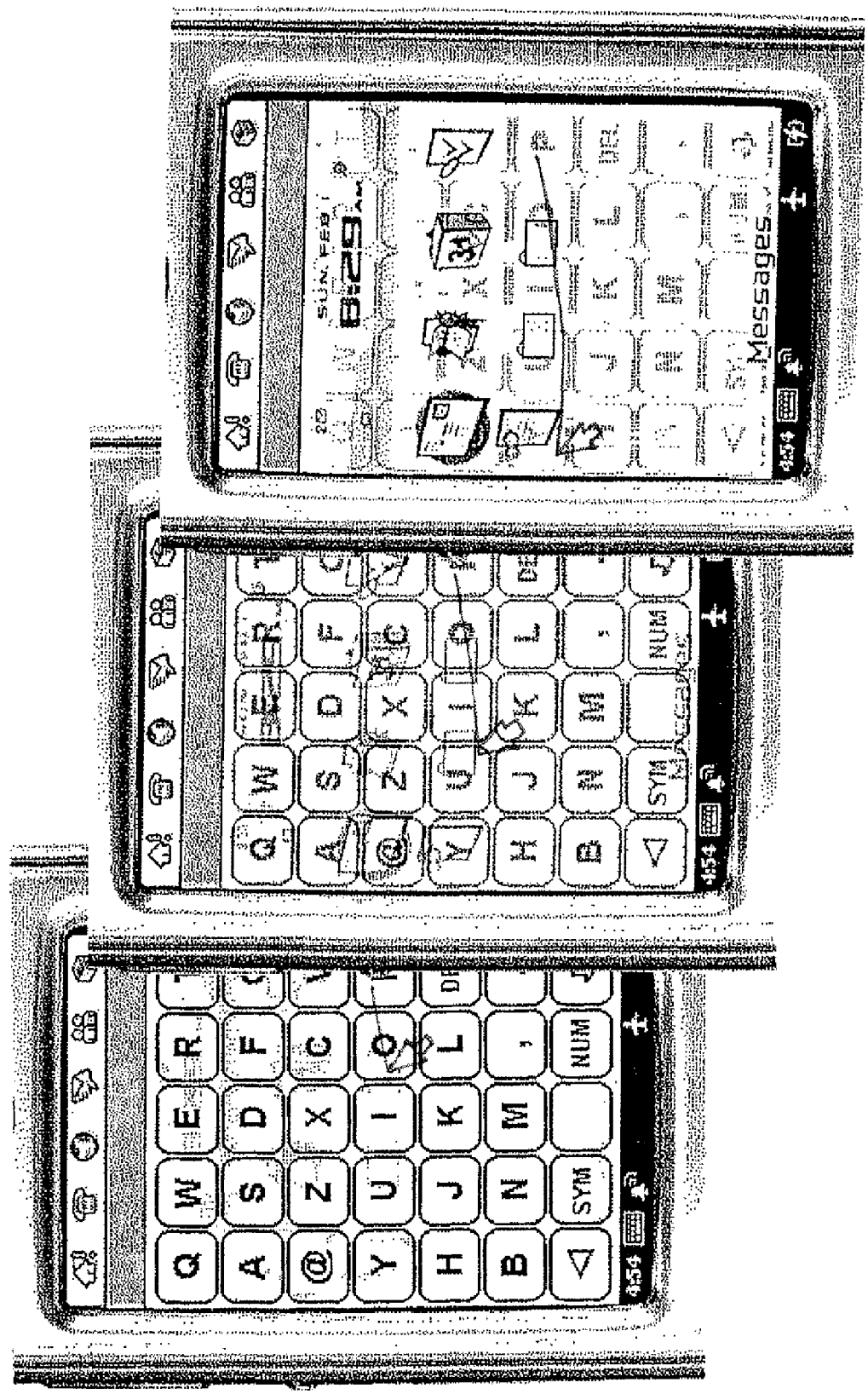
FIG. 24 is a schematic diagram showing the display undergoing yet another progressive keypad transparency change.

FIG. 20 is a detailed block diagram of a preferred mobile station 202. Mobile station 202 is preferably a two-way communication device having at least voice and advanced data communication capabilities, including the capability to communicate with other computer systems. Depending on the functionality provided by mobile station 202, it may be referred to as a data messaging device, a two-way pager, a cellular telephone with data messaging capabilities, a wireless Internet appliance, or a data communication device (with or without telephony capabilities). Mobile station 202 may communicate with any one of a plurality of base station transceiver systems 200 within its geographic coverage area. Mobile station 202 selects or helps select which one of base station transceiver systems 200 it will communicate with.

Mobile station 202 will normally incorporate a communication subsystem 211, which includes a receiver 212, a transmitter 214, and associated components, such as one or more (preferably embedded or internal) antenna elements 216 and 218, local oscillators (LOs) 213, and a processing module such as a digital signal processor (DSP) 220. Communication subsystem 211 is analogous to RF transceiver circuitry 108 and antenna 110 shown in FIG. 19. As will be apparent to those skilled in field of communications, particular design of communication subsystem 211 depends on the communication network in which mobile station 202 is intended to operate.

Mobile station 202 may send and receive communication signals over the network after required network registration or activation procedures have been completed. Signals received by antenna 216 through the network are input to receiver 212, which may perform such common receiver functions as signal amplification, frequency down conversion, filtering, channel selection, and like, and in example shown in FIG. 20, analog-to-digital (A/D) conversion. A/D conversion of a received signal allows more complex communication functions such as demodulation and decoding to be performed in DSP 220. In a similar manner, signals to be transmitted are processed, including modulation and encoding, for example, by DSP 220. These DSP-processed signals are input to transmitter 214 for digital-to-analog (D/A) conversion, frequency up conversion, filtering, amplification and transmission over communication network via antenna 218. DSP 220 not only processes communication signals, but also provides for receiver and transmitter control. For example, the gains applied to communication signals in receiver 212 and transmitter 214 may be adaptively controlled through automatic gain control algorithms implemented in DSP 220.

Network access is associated with a subscriber or user of mobile station 202, and therefore mobile station 202 requires a memory module 262, such as a Subscriber Identity Module or "SIM" card or a Removable User Identity Module (R-UIM), to be inserted in or connected to an interface 264 of mobile station 202 in order to operate in the network. Alternatively, memory module 262 may be a non-volatile memory which is programmed with configuration data by a service provider so that mobile station 202 may operate in the network. Since mobile station 202 is a mobile battery-powered device, it also includes a battery interface 254 for receiving one or more rechargeable batteries 256. Such a battery 256 provides electrical power to most if not all electrical circuitry in mobile station 202, and battery interface 254 provides for a mechanical and electrical connection for it. The battery interface 254 is coupled to a regulator (not shown in FIG. 20) which provides power V+ to all of the circuitry.

Mobile station 202 includes a microprocessor 238 (which is one implementation of controller 106 of FIG. 19) which controls overall operation of mobile station 202. This control includes network selection techniques of the present application. Communication functions, including at least data and voice communications, are performed through communication subsystem 211. Microprocessor 238 also interacts with additional device subsystems such as a display 222, a flash memory 224, a random access memory (RAM) 226, auxiliary input/output (I/O) subsystems 228, a serial port 230, a keyboard 232, a speaker 234, a microphone 236, a short-range communications subsystem 240, and any other device subsystems generally designated at 242. Some of the subsystems shown in FIG. 20 perform communication-related functions, whereas other subsystems may provide "resident" or on-device functions. Notably, some subsystems, such as keyboard 232 and display 222, for example, may be used for both communication-related functions, such as entering a text message for transmission over a communication network, and device-resident functions such as a calculator or task list. Operating system software used by microprocessor 238 is preferably stored in a persistent store such as flash memory 224, which may alternatively be a read-only memory (ROM) or similar storage element (not shown). Those skilled in the art will appreciate that the operating system, specific device applications, or parts thereof, may be temporarily loaded into a volatile store such as RAM 226.

Microprocessor 238, in addition to its operating system functions, preferably enables execution of software applications on mobile station 202. A predetermined set of applications which control basic device operations, including at least data and voice communication applications, will normally be installed on mobile station 202 during its manufacture. A preferred application that may be loaded onto mobile station 202 may be a personal information manager (PIM) application having the ability to organize and manage data items relating to user such as, but not limited to, e-mail, calendar events, voice mails, appointments, and task items. Naturally, one or more memory stores are available on mobile station 202 and SIM 256 to facilitate storage of PIM data items and other information.

The PIM application preferably has the ability to send and receive data items via the wireless network. In a preferred embodiment, PIM data items are seamlessly integrated, synchronized, and updated via the wireless network, with the mobile station user's corresponding data items stored and/or associated with a host computer system thereby creating a mirrored host computer on mobile station 202 with respect to such items. This is especially advantageous where the host computer system is the mobile station user's office computer system. Additional applications may also be loaded onto mobile station 202 through network, an auxiliary I/O subsystem 228, serial port 230, short-range communications subsystem 240, or any other suitable subsystem 242, and installed by a user in RAM 226 or preferably a non-volatile store (not shown) for execution by microprocessor 238. Such flexibility in application installation increases the functionality of mobile station 202 and may provide enhanced on-device functions, communication-related functions, or both. For example, secure communication applications may enable electronic commerce functions and other such financial transactions to be performed using mobile station 202.

In a data communication mode, a received signal such as a text message, an e-mail message, or web page download will be processed by communication subsystem 211 and input to microprocessor 238. Microprocessor 238 will preferably further process the signal for output to display 222 or alternatively to auxiliary I/O device 228. A user of mobile station 202 may also compose data items, such as e-mail messages, for example, using keyboard 232 in conjunction with display 222 and possibly auxiliary I/O device 228. Keyboard 232 is preferably a complete alphanumeric keyboard and/or telephone-type keypad. These composed items may be transmitted over a communication network through communication subsystem 211.

For voice communications, the overall operation of mobile station 202 is substantially similar, except that the received signals would be output to speaker 234 and signals for transmission would be generated by microphone 236. Alternative voice or audio I/O subsystems, such as a voice message recording subsystem, may also be implemented on mobile station 202. Although voice or audio signal output is preferably accomplished primarily through speaker 234, display 222 may also be used to provide an indication of the identity of a calling party, duration of a voice call, or other voice call related information, as some examples.

Serial port 230 in FIG. 20 is normally implemented in a personal digital assistant (PDA)-type communication device for which synchronization with a user's desktop computer is a desirable, albeit optional, component. Serial port 230 enables a user to set preferences through an external device or software application and extends the capabilities of mobile station 202 by providing for information or software downloads to mobile station 202 other than through a wireless communication network. The alternate download path may, for example, be used to load an encryption key onto mobile station 202 through a direct and thus reliable and trusted connection to thereby provide secure device communication.

Short-range communications subsystem 240 of FIG. 20 is an additional optional component which provides for communication between mobile station 202 and different systems or devices, which need not necessarily be similar devices. For example, subsystem 240 may include an infrared device and associated circuits and components, or a Bluetooth™ communication module to provide for communication with similarly-enabled systems and devices. Bluetooth™ is a registered trademark of Bluetooth SIG, Inc.

The above-described embodiments are meant to be illustrative of preferred embodiments and are not intended to limit the scope of the present invention. Also, various modifications, which would be readily apparent to one skilled in the art, are intended to be within the scope of the present invention. The only limitations to the scope of the present invention are set forth in the following claims.

I claim:

1. A method for changing a transparency level of a virtual keypad overlay on a display, comprising the steps of:
    activating a pointing device;
    dragging the pointing device for a predetermined distance greater than a minimum predetermined threshold; and
    changing the transparency level of the virtual keypad overlay on the display by a predetermined amount in response to dragging said pointing device for said distance.

2. The method of claim 1, wherein the display is a touchscreen and wherein the pointing device is one of a stylus, a wand, a user's finger, the activating step further comprises one of pressing a corresponding one of the stylus, wand, and finger on the display.

3. The method of claim 1, wherein the pointing device is a mouse, the activating step further comprises clicking a mouse button.

4. The method of claim 1, wherein moving the pointing device up after said activating step causes the transparency level to decrease.

5. The method of claim 1, wherein moving the pointing device down after said activating step causes the transparency level to increase.

6. The method of claim 1, wherein dragging the pointing device sideways causes the transparency level to change.

7. The method of claim 1, wherein a change in transparency is determined by a length said pointing device is dragged during said dragging step.

8. The method of claim 1, wherein said dragging step causes the transparency level of an icon on the display to change inversely to the transparency level of the virtual keypad.

9. The method of claim 1, wherein if said dragging step is wholly within a key of said virtual keypad the transparency level is not changed.

10. The method of claim 1, further comprising:
    determining whether the pointing device has been dragged for a distance corresponding to increasing the transparence level of the virtual keypad beyond a maximum transparency threshold; and
    deactivating virtual keypad key press registration if the transparency level of the virtual keypad is greater than the maximum transparency threshold.

11. A device with a variable transparency virtual keypad overlay, said device comprising:
    a display;
    a pointing device for input on said display; and
    a processor configured to:
        register when a pointing device is activated and
        determine that said pointing device has been dragged for a predetermined distance greater than a minimum threshold, a
        cause the transparency level of the virtual keypad on the display to change by a predetermined amount in response to dragging said pointing device for said distance.

12. The device of claim 11, wherein the display is a touchscreen and said pointing device is one of a stylus, a wand, a user's finger, the activating pointing device further comprises one of pressing a corresponding one of the stylus, wand. and finger on the display.

13. The device of claim 11, wherein said pointing device is a mouse, activating the mouse further comprises clicking the mouse button.

14. The device of claim 11, wherein said processor decreases the transparency level of the virtual keypad when the pointing device is dragged up.

15. The device of claim 11, wherein said processor increases the transparency level of the virtual keypad when the pointing device is dragged down.

16. The device of claim 11, wherein said processor changes the transparency level of the virtual keypad when the pointing device is dragged sideways.

17. The device of claim 11, wherein said processor determines a change in transparency by a length along said display said pointing device is dragged.

18. The device of claim 11, wherein said processor varies the transparency of icons displayed on said display inversely to the transparency level of said virtual keypad.

19. The device of claim 11, wherein the processor is further:
    configured to determine whether the pointing device has been dragged for a distance corresponding to increasing the transparence level of the virtual keypad beyond a maximum transparency threshold; and
    configured to deactivate virtual keypad key press registration if the transparency level of the virtual keypad is greater than the maximum transparency threshold.

20. A method of creating pulsation in a virtual keyboard comprising the steps of:
    setting a maximum transparency level, a minimum transparency level, and a delta transparency level;
    while the virtual keyboard is visible,
        checking whether the current keyboard transparency level is greater than the maximum transparency level or less than the minimum transparency level, and if yes, changing the sign of the delta transparency level;
        adding the delta transparency level to the current keyboard transparency level to form a new current keyboard transparency level;
        displaying the virtual keyboard at the new current keyboard transparency level;
        waiting for a predetermined time period; and
        looping back to the checking step.

21. The method of claim 20, wherein said displaying step further displays icons with a transparency inversely proportional to said current keyboard transparency level.

* * * * *